(12) United States Patent
Yu et al.

(10) Patent No.: US 11,366,957 B2
(45) Date of Patent: Jun. 21, 2022

(54) REAL-TIME RENDERING BASED ON EFFICIENT DEVICE AND SERVER PROCESSING OF CONTENT UPDATES

(71) Applicant: Palantir Technologies Inc., Denver, CO (US)

(72) Inventors: Stephanie Yu, New York, NY (US); Thomas Haynes, Brooklyn, NY (US)

(73) Assignee: Palantir Technolgoies Inc., Denver, CO (US)

(*) Notice: Subject to any disclaimer, the term of this patent is extended or adjusted under 35 U.S.C. 154(b) by 0 days.

(21) Appl. No.: 16/557,449

(22) Filed: Aug. 30, 2019

(65) Prior Publication Data

US 2020/0065070 A1   Feb. 27, 2020

Related U.S. Application Data

(63) Continuation of application No. 15/672,062, filed on Aug. 8, 2017, now Pat. No. 10,437,568.

(Continued)

(51) Int. Cl.
| | |
|---|---|
| *G06F 40/143* | (2020.01) |
| *G06F 8/34* | (2018.01) |
| *G06F 40/166* | (2020.01) |
| *G06F 3/0482* | (2013.01) |
| *G06F 40/274* | (2020.01) |

(52) U.S. Cl.
CPC ............. *G06F 40/143* (2020.01); *G06F 8/34* (2013.01); *G06F 40/166* (2020.01); *G06F 3/0482* (2013.01); *G06F 40/274* (2020.01)

(58) Field of Classification Search
CPC ....................................................... G06F 8/34
See application file for complete search history.

(56) References Cited

U.S. PATENT DOCUMENTS 5,850,548 A * 12/1998 Williams .................. G06F 8/34
717/107
6,163,879 A * 12/2000 Mackey .................... G06F 8/33
715/744

(Continued)

OTHER PUBLICATIONS

M. Jazayeri, "Some Trends in Web Application Development," Future of Software Engineering (FOSE '07), 2007, pp. 199-213, doi: 10.1109/FOSE.2007.26. (Year: 2007).*

*Primary Examiner* — James D. Rutten
(74) *Attorney, Agent, or Firm* — Knobbe, Martens, Olson & Bear, LLP

(57) ABSTRACT

Systems, computer storage media, and methods for real-time rendering based on efficient device and server processing of content updates. One of the methods includes presenting user interface information that includes multiple visual portions associated with input of types of code. User input of code with respect to one or more of the visual portions is received, and code input in a particular visual portion includes code to be compiled and/or imports associated with particular libraries. Rendering of the input code is caused, and the rendering is presented in an output visual portion. A system can receive the code input in the particular visual portion over a network. The system can compile the received code and package the received code with associated libraries. The system can provide the packaged code to the user device to be interpreted during rendering of the input code.

20 Claims, 6 Drawing Sheets

Related U.S. Application Data

(60) Provisional application No. 62/507,993, filed on May 18, 2017.

(56) References Cited

U.S. PATENT DOCUMENTS

| | | | |
|---|---|---|---|
| 6,185,734 B1 * | 2/2001 | Saboff | G06F 9/44521 717/164 |
| 7,194,680 B1 * | 3/2007 | Roy | G06F 40/174 715/205 |
| 8,473,971 B2 * | 6/2013 | Meijer | G06F 9/449 719/331 |
| 8,572,559 B2 * | 10/2013 | Calvin | G06F 16/9577 717/106 |
| 10,437,568 B1 | 10/2019 | Yu et al. | |
| 2014/0047413 A1 * | 2/2014 | Sheive | G06F 8/30 717/110 |
| 2015/0074633 A1 * | 3/2015 | Slack | G06F 8/75 717/101 |
| 2015/0288774 A1 * | 10/2015 | Larabie-Belanger | G06F 3/04842 715/758 |
| 2016/0188301 A1 * | 6/2016 | Zang | G06F 8/33 717/113 |

* cited by examiner

REAL-TIME RENDERING BASED ON EFFICIENT DEVICE AND SERVER PROCESSING OF CONTENT UPDATES

CROSS-REFERENCE TO RELATED APPLICATIONS

This application claims priority to, and is a continuation of, U.S. patent application Ser. No. 15/672,062 titled "REAL-TIME RENDERING BASED ON EFFICIENT DEVICE AND SERVER PROCESSING OF CONTENT UPDATES" and filed Aug. 8, 2017. U.S. patent application Ser. No. 15/672,062 claims priority to U.S. Prov. Patent Appl. No. 62/507,993 titled "REAL-TIME RENDERING BASED ON EFFICIENT DEVICE AND SERVER PROCESSING OF CONTENT UPDATES" and filed May 18, 2017. Each of the above-recited applications are hereby incorporated by reference herein in their entirety.

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to systems and techniques for data integration, analysis, and visualization. More specifically, presentation of content is described.

BACKGROUND

When designing web pages, developers utilize complex development set-ups to write code, create images, check functionality, and so on. In general, a developer can prepare different files for markup code (e.g., Hypertext Markup Language), style sheet code (e.g., Cascading Style Sheets), and other code (e.g., JavaScript, TypeScript, CoffeeScript). To view a web page being designed, the developer can cause the rendering of the different files by a web browser. The developer can then adjust one or more of the files based on the rendering.

SUMMARY

This specification describes real-time presentation of content in response to entry of code in a user interface (e.g., user interface 10 illustrated in FIG. 1). The user interface, for example a rendered web page in a web browser, can include a plurality of visual portions each associated with a particular type of code a user can input. For example, a first type of code can be markup code, a second type of code can be style sheet code, and a third type of code can be dynamic code such as JavaScript. The user interface can further include a visual portion that presents an output associated with the input code. For example, the output can represent the input code as rendered by a web browser. In this way, the user can easily sketch out code and view presentation of an associated output.

Advantageously, the user interface can present a visual representation of the input code in real-time (e.g., substantially real-time, as will be described), such that the user can rapidly ascertain the effects of modifications to the input code. For example, as the user inputs markup code and/or style sheet code, the user interface can present real-time output associated with the input code. As will be described, a user device presenting the user interface can render the input code, and cause the user interface to present the rendering in a particular visual portion (e.g., the visual portion can be associated with an iframe).

To reduce a need for processing power, and thus to conserve power and/or battery, the techniques described herein can limit an extent to which a user device is required to perform compilations of code or complex processing of code libraries. For example, to design dynamic content, such as dynamic web pages, a user can utilize TypeScript code. The TypeScript code can, for example to be interpreted by a web browser, be transcompiled into JavaScript code. Additionally, any code libraries that the user is relying on, and has imported, can be packaged into the JavaScript code. This compilation (e.g., transcompilation) can be costly to the user device, such that repeated modifications to such code can reduce battery, tie up system resources, and so on. Therefore, as will be described, a system (e.g., server system) in communication with the user device, for example via the internet, can perform any compilations, and provide the compiled result to the user device for utilization when rendering markup and/or style sheet code.

In addition to the above-described technical improvements, the system can ease a transition between inputting code in the user interface to test or mockup designs, and using the code in a production environment. As an example, when using code in a production environment, for example a server serving up web pages based on the code, one or more code libraries may be imported into the code via import statements in JavaScript, TypeScript, and so on. The code libraries can be stored locally at the server, and can be packaged with user specified code and provided in response to requests for an associated web page. As will be described, the system described herein can obtain any imported code libraries, for example via a package manager, such that the user can utilize JavaScript or TypeScript, import statements. The system can then provide the obtained code libraries, along with the compiled result described above, as a package to the user device. Furthermore, the system can obtain any specified version of a code library, such that the user can rapidly compare versions of code libraries.

In an example implementation of the user interface in which the system does not obtain code libraries, a user may be forced to statically import one or more code libraries using markup code (e.g., <script src=https://example.com"></script>). This static importation may cause an entire code library to be obtained by a user's user device, whereas a smaller portion of the code library may be desired. Thus, in this example, if the user copies the code input into the user interface for use in a production environment, the user be required to remove the static importations and replace them with import statements in, for example, JavaScript. Therefore, through the interaction of the system and user device described above, the techniques described herein reduce complexities associated with real-time content rendering based on input code. That is, and in line with a production development process, modules may be imported piecemeal instead of entire libraries at once. Thus, the user can immediately use the code input into the user interface as production code.

Furthermore, since the system can obtain code libraries, and not merely statically import the code libraries, the system can enable auto-complete functionality as the user inputs code. As an example, the imported code libraries can enable typings, which can include function definitions and variables, and which can enable auto-complete functionality. For example, as the user input a variable, function, class name, and so on, that is specified in a code library, the system can cause presentation of selectable auto-complete options associated with the input. As an example, the user can input a name (e.g., variable, function, or class, name) followed by a dot operator (e.g., an operator associated with object oriented programming). In this example, the system can obtain the input name, and then identify names that can follow the dot operator based on the code library. For example, the input name can be associated with a class, and the identified names can be names of functions associated with the code library. Additionally, documentation that a code library annotates functions with can be surfaced. For example, if a developer attempts to utilize an example function "array.copy(myArray)", auto-complete could access and present the documentation. As an example of documentation, the documentation can indicate what the function does, what arguments are required, as well as variable types of the required arguments.

In this way, the system described herein allows for a better and quicker development process, since developers will not need to look up documentation for each library for the function definitions. Instead, the developers will be able to find the function definitions displayed right in the user interface (e.g., editor) ready for utilization.

In this way, the user interface described herein solves problems associated with technology, and improves functioning of the computer. That is, through the combined usage of the user device and system, improvements to designing content are enabled. For example, the techniques described herein can reduce processing power required to quickly design content. Furthermore, the techniques described herein can reduce a number of applications required to design content. For example, reducing applications being sketching software and development environments, to just a development environment. As another example, the techniques described herein can enable functionality otherwise relegated to use of complex, and resource hungry, integrated development environments, such as auto-completion based on specified code libraries, and so on.

As will be further described, the output associated with code input by a user can be automatically presented on a live web page. For example, the live web page can be a web page being actively served by a server to end users. The live web page can include an embedded frame (e.g., iframe), which can include code input in the user interface described herein. In this way, when end users access the live web page, the live web page can include the input code and the end users' web browsers can render the input code. Optionally, the user interface described herein can store the input code, such that a back-end web application can obtain a current version of the input code when generating a web page to be provided to end users. Optionally, as described above, an iframe can be utilized such that a current version of the input code is automatically obtained. In this way, the techniques described herein can reduce a barrier to designing content. For example, instead of being required to set up complex development environments, users can access the user interfaces described herein, and cause an output associated with input code to be automatically published on their web pages.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations compris-

DETAILED DESCRIPTION

Overview

Figure 1A:
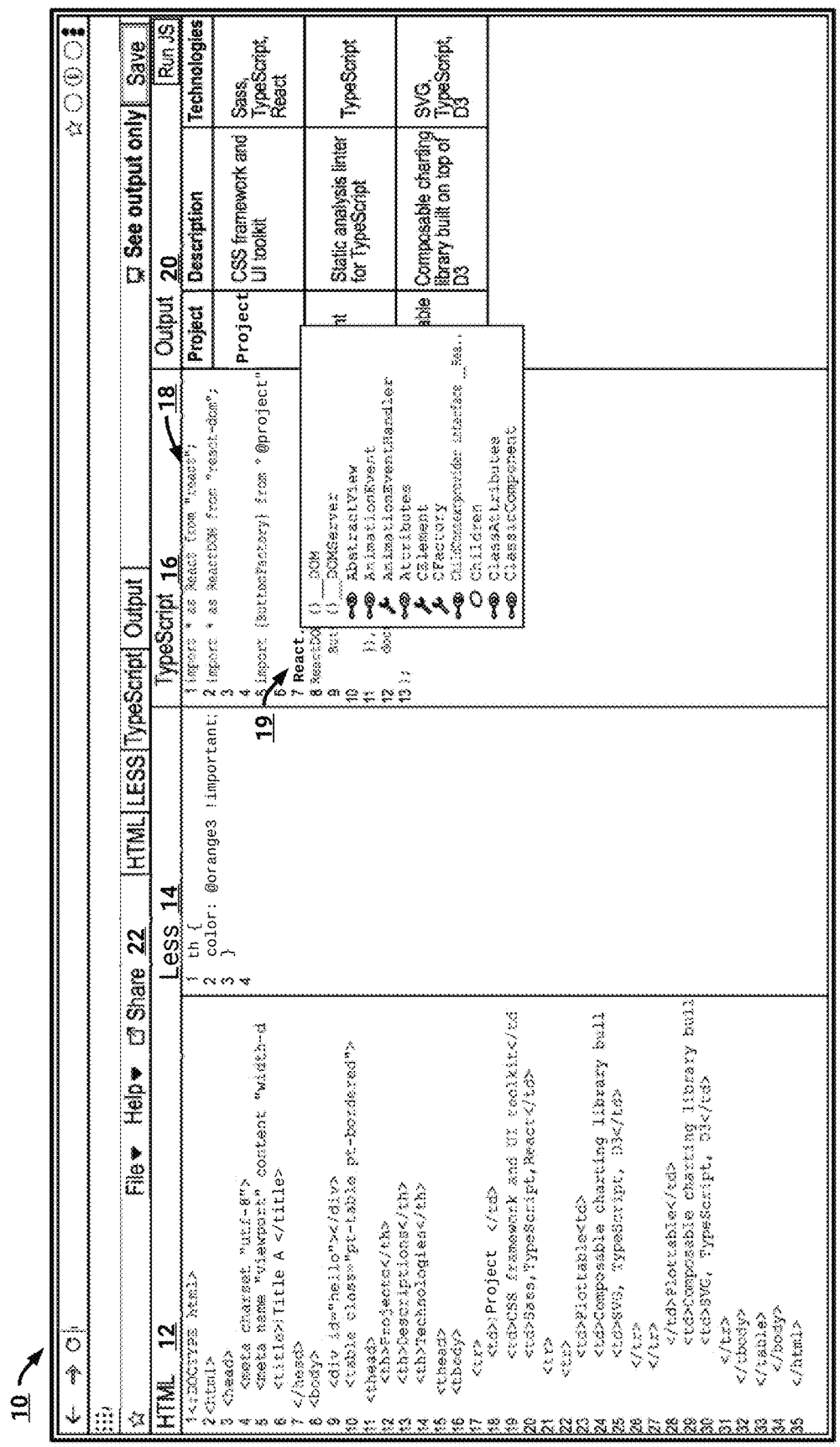
FIG. 1A illustrates an example user interface for designing content.

This specification describes techniques for enabling real-time creation, editing, designing, and so on, of content. For example, content can include web page content, application content (e.g., software applications, such as "apps" associated with user devices), and other content designable, at least in part, via input of code. Example code can include markup code (e.g., Hypertext Markup Language (HTML) code), style sheet code (e.g. Cascading Style Sheets (CSS), Sass, Less, and so on), dynamic code (e.g., JavaScript, CoffeeScript, TypeScript, and so on). Further examples can optionally include Java, Swift, C #, C++, Python, Ruby, and so on.

As will be described, user interfaces can be utilized for input of code, and, in real-time, present output associated with the input code. For example, a user can utilize a user device (e.g., a computer, laptop, tablet, smart phone, and so on) to access a user interface, and via interactions with the user interface, design and view rendered content based on the interactions. The user interface can optionally be associated with a content page (e.g., web page), which can be accessible at one or more systems over one or more networks (e.g., local or wide area network, the internet). As an example, the user device can request the content page from a system (e.g., the content update system 100 described below), and present (e.g., render) the content page on a display of the user device. The user can then interact with the content page to input code (e.g., type code, indicate locations of files that include code, verbally speak code into his/her user device, and so on).

To present an output associated with input code, the user device can render the input code and present an output in the user interface. For example, if the input code includes markup code and style sheet code, a web browser executing on the user device can render the input code and include the rendering in the web browser. As will be described, the user interface can include a particular visual portion associated with the output, and the particular visual portion can be associated with a frame. For example, the frame can be an iframe, and the iframe can include the input code in real-time (e.g., as the user inputs code), such that it can be rendered in real-time. In this way, the user can quickly sketch out design content, and view updates in real-time.

Additionally, the user can input dynamic code, which in this specification includes code that enables dynamic interactivity, processing, and so on, and which as described above can include JavaScript, TypeScript, CoffeeScript, and so on. As the user inputs the dynamic code, the user's user device can optionally run the dynamic code (e.g., cause interpretation of JavaScript, transcompile TypeScript into JavaScript and run the JavaScript). However, and as will be described below, a system associated with the user interface (e.g., the content update system 100 at which the user interface is accessible, for example as a web page) can process the dynamic code. For example, the user can input TypeScript into the user interface on his/her user device, and the user device can provide (e.g., in substantially real-time) the input to the system for processing. The system can transcompile (e.g., convert) the TypeScript into JavaScript, and provide the JavaScript to the user device for utilization during presentation of the input code. In this way, processing can be offloaded from the user device to the system, conserving processing resources, battery, and so on. Additionally, the user device can therefore be a thin client, such that complex web page content can be fully designed on the thin client, and heavier (e.g., more resource intensive processing tasks) can be performed on the system. Optionally, the system can generate a rendering based on all of the input code, such that the system can utilize input markup code, style sheet code, and dynamic code, and the thin client can provide interactions to the system (e.g., the input code) and present renderings received from the system.

The dynamic code can further specify particular code libraries that the dynamic code utilizes. For example, the user can specify code libraries, and utilize functions from the code libraries to perform particular functionality. In contrast to example techniques which may require the user to statically import code libraries via markup code, the techniques described herein enable the user to import code libraries in the dynamic code. As described above, static import of large code libraries can be disfavored, for example the imported libraries can be global in scope, cause design content to load more slowly as the libraries are obtained, and in general may not be part of common real-world design usage. Therefore, the user can utilize import statements in the dynamic code, and code libraries can be obtained by the system (e.g., the content update system 100). Additionally, the import statements can cause importation of specific modules in the code libraries, such that only portions actually being utilized can be imported and are thus local in scope. Importing of these modules can be more efficient than importing larger code libraries, thus improving processing times, response time, and so forth. As will be described, the system can maintain packages (e.g., common packages), and can optionally utilize a package manager (e.g., npm) to obtain any arbitrary package. The system can package the libraries and/or modules, for example utilizing Webpack, and can provide the package to the user device. As will be described below, the user device can utilize the package to present the input code.

Particular versions of each code library can be specified by the user, such that the user can rapidly test designs utilizing different versions of libraries being utilized. For example, an example code library may receive a new version with regularity (e.g., every week, every month), which can cause difficulty for designers and developers to ensure that their dynamic code functions as they expect. As will be described, the user can request that the system import a particular version, such that the user can view an associated output. Optionally the user can specify multiple versions, and view (e.g., side-by-side) multiple associated outputs.

An additional technical benefit associated with the system (e.g., content update system 100) obtaining code libraries, modules, and so on, includes enabling auto-complete as the user inputs dynamic code. For example, the user can indicate that the system is to be import a particular module, and input dynamic code that references the particular module. The user's user device can provide the user's input to the system in real-time, such that the system can obtain the particular module. As the user subsequently inputs dynamic code, the system can determine whether the input dynamic code references the particular module, and if so, can cause presentation of selectable options associated with auto-completion of the input dynamic code. For example, and as illustrated in FIG. 1A, as the user inputs a particular name, the system can cause presentation of selectable options associated with the particular name.

The techniques described herein can thus enable a user (e.g., designer, developer) to easily create and view content associated with input code. As will be described below, an output associated with input code can be presented on, for example, a web page being served to users over a network (e.g., the internet). For instance, a developer can design a web page to include one or more distinct portions of the web page. For each distinct portion, the developer can utilize the user interfaces described herein to input code associated with the distinct portion, and the web page can present an output associated with the input code. For example, if a user requests the web page, a back-end web application can generate the web page such that it includes a current version of the input code. The web page being served to users over the network can therefore include one or more of these distinct portions. The developer can therefore optionally modify input code associated with a distinct portion, and the web page being served can include the modified distinct portion.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Code: Computer instructions written in a human-readable language which can be interpreted, compiled, assembled, and so on. Code can be separated into types of code according to programming language, and as described above can include markup code, style sheet code, dynamic code, and so on.

Dynamic Code: In this specification, dynamic code includes code to dynamically respond to interactions, perform processing, and so o on, and which can include JavaScript, TypeScript, CoffeeScript, and so on.

Code Library: A library of pre-written code that can provide particular functionality. The code library can include one or more modules, each of which can represent a self-contained portion of source code.

FIG. 1A illustrates an example user interface 10 for designing content. The user interface 10 includes multiple visual portions, for example visual portions 12, 14, 16, and 20. As described above, one or more of the visual portions can be associated input of particular types of code. In the example of FIG. 1A, the types of code are associated with generating web page content, however it should be understood that other types of code can be utilized to generate other content. Additionally, the user interface 10 includes a visual portion associated with output 20 generated based on the input code. For example, the output 20 can be rendered according to the input code included in visual portions 12, 14, and 16.

As illustrated, visual portion 12 is associated with input of markup code (e.g., HTML), and includes example markup code associated with a table. For example, the table presented in the output 20. Visual portion 14 is associated with input of style sheet code, which in the example of FIG. 1A is Less code. The user interface 10 can enable selection between differing programming language associated with types of code. For example, visual portion 12 can be utilized to input markup code other than HTML (e.g., markdown, and so on, which can be converted to HTML). Similarly, differing style sheet code can be utilized such as CSS, Sass, and so on. A user of the user interface 10 can interact with a selectable option (e.g., select 'HTML'), and a drop down can be presented in the user interface 10 to select a particular programming language. Optionally, as the user inputs code in a particular visual portion (e.g., visual portion 12), the user interface can update a name associated with the particular visual portion according to a particular programming language being utilized. For example, if the user inputs CSS code, the presented name associated with visual portion 14 can be updated to reflect CSS. In another example, if the user inputs Less code, the presented name associated with visual portion 14 can be updated to reflect Less. Optionally, a user device presenting the user interface 10 can parse the input code to determine names, syntax, schema, and so on, associated with particular programming languages, and can update the user interface. Optionally, a system in communication with the user device, for example a system from which the user interface 10 can be obtained, can determine a programming language being utilized.

As code is input into visual portions 12 and 14, the output 20 can update to reflect a rendered version of the input. For example, the output 20 can be a iframe, and a user device presenting the user interface 10 can render the input code (e.g., a web browser executing on user device) and present an output in the visual portion 20. Therefore, the output 20 can be presented in real-time as input code is included in visual portions 12 and 14. In this specification, real-time can represent processing the input code as it's received, such that the output 20 can reflect updates received to the input code. Optionally, the output 20 can be updated subsequent to any user input (e.g., any additional character included in a visual portion), or can be updated subsequent to completion of words, or when a user places text on a new line, when the user inputs a closing tag or a particular closing tag (e.g., </head>, </tr>, and so on), when the user inputs a closing brace (e.g., "}", as illustrated in visual portion 14), and so on.

Visual portion 16, as illustrated, is associated with dynamic code. In the example of FIG. 1A, visual portion 16 indicates input of TypeScript code. In this way, the user of the user interface 10 can enable dynamic functionality with respect to the output 20. Since the output 20 represents a generated (e.g., rendered) output associated with the input code, the output 20 can include the dynamic functionality. As will be described in more detail below, a system (e.g., the content update system 100) can receive the code input into visual portion 16, and provide a packaged result associated with the input. As an example, the system can transcompile the TypeScript code into JavaScript, and can package the JavaScript with code libraries or modules imported by the user. Similarly, if the visual portion is associated with input of JavaScript code, the system can obtain imported code libraries or modules, and generate a package including the input code to be provided to the user device.

As illustrated, the user has imported "React," and has imported the code library as a namespace (e.g., importation as an object). The system, subsequent to the user importing the code library, can access the code library or obtain the code library (e.g., via a package manager). Thus, the system can provide the JavaScript, packaged with the code library, to the user device for interpretation when generating the output 20.

The user interface 10 can further enable the user to specify a particular version of the code library. For example, the user interface 10 can optionally cause a name of the code library to be selectable, and upon selection, can present versions available for inclusion. As an example, the system can utilize a package manager to obtain information identifying available versions. Optionally, a web page associated with the code library can be accessed and parsed to identify available versions. The system can provide information identifying the available versions (e.g., a threshold number of most recent versions, all versions, and so on) to the user device for presentation in the user interface 10. Additionally, the system can update the user interface 10 (e.g., the system can cause updating of the user interface via an asynchronous call to the user device) to present the available versions. Upon selection of a particular version, the system can obtain (e.g., via a package manager), or access (e.g., the system can store code libraries), the particular version.

Optionally, when a code library is specified in the user interface 10, the system can obtain a most recent version of the code library. Optionally, the system can identify a version of the code library most recently requested by the user, and utilize the identified version. For example, if the user has imported a code library and specified a version, the system can prefer that the specified version be utilized. Optionally, the system can automatically utilize the specified version if the user has requested the specified version greater than a threshold number of times and/or within a threshold amount of time. In some implementations, the system can analyze the code input into visual portion 16, and identify a version that is associated with the input code. For example, if a particular version utilizes particular function names, classes, or variables, which in combination can distinguish between other versions, the system can analyze the input code to determine whether the input code utilizes any new function names, classes, or variables. The system can then automatically select the particular version, and cause presentation of the selected version in the user interface 10. If the system identifies multiple versions that may comport with the input code, the system can indicate a threshold number of the multiple versions (e.g., a most recent threshold number).

Similarly, the user interface 10 can include functionality for the user to specify multiple versions of a code library. The user interface 10 can then output, in visual portion 20, different outputs corresponding to respective versions of the code library. The user can then interact with each output and identify whether a version of the code library is causing problems. Optionally, the user interface 10 can cycle through each of the specified versions, for example the output in visual portion 20 can be associated with each version for a threshold amount of time (e.g., 5 seconds, 20 seconds, a user-selectable amount of time). As each output is presented, the user interface 10 can update to include an identification of the version being utilized.

As illustrated in FIG. 1A, the user has input a particular name (e.g., "React"), and the user interface 10 has updated to present auto-complete options associated with the particular name. For example, the user interface 10 includes available functions that can be selected based on the particular name. As described above, the system can obtain the input code (e.g., as the user enters the code) and based on the specified code library 18, can implement auto-completion functionality. As an example, the system can update the user interface to present available auto-completion names for selection. For instance, the system can provide an asynchronous call to the user device, update the user interface via AJAX, WebSockets, and so on. In this way, the user interface 10 can helpfully present useful information to the user. Additionally, based on the system obtaining input code and having access to code libraries, the user interface 10 improves upon an example implementation in which the user is required to statically import code libraries.

The user interface 10 includes a selectable option 22 to share the user interface 10 with another user. For example, the input code can be saved (e.g., by the system), and another user can access the saved input code formatted same, or similar, to user interface 10. Optionally, the system can enable multiple users to edit input code, such that if a first user makes an edit to a portion of input code, the input code can automatically be updated for the other users. The user interface 10 can therefore be associated with a web application executing on the system, such that the system maintains an overall state associated with the user interface 10 (e.g., input code, formatting, code libraries, output, and so on).

Optionally, the user interface 10 can include functionality to fork the input code included in user interface 10. That is, a first user can use selectable option 22 to share the user interface 10 with a second user. As will be described below, the first user can share a reference (e.g., a hyperlink) associated with the user interface 10, and the second user can access the user interface 10 based on the reference. The first user can optionally indicate that the reference is to be associated with a fork of the input code, such that modifications made by the second user are to be separately stored. Upon selection, the second user can view the input code entered by first user in the visual portions 12, 14, 16, and make modifications. Similarly, users can create forks of their own input code, and work with differing forks of the input code. The system can maintain states associated with each fork, and each fork can be separately accessible. Additionally, the system can maintain versions of input code, such that new versions can be created by users and each version can be saved by the system. Optionally, the system can automatically save a new version for each change made by a user to input code, or can save a new version upon user interaction with a save option in the user interface 10, or can save a new version after a threshold amount of time, and so on.

Figure 1B:
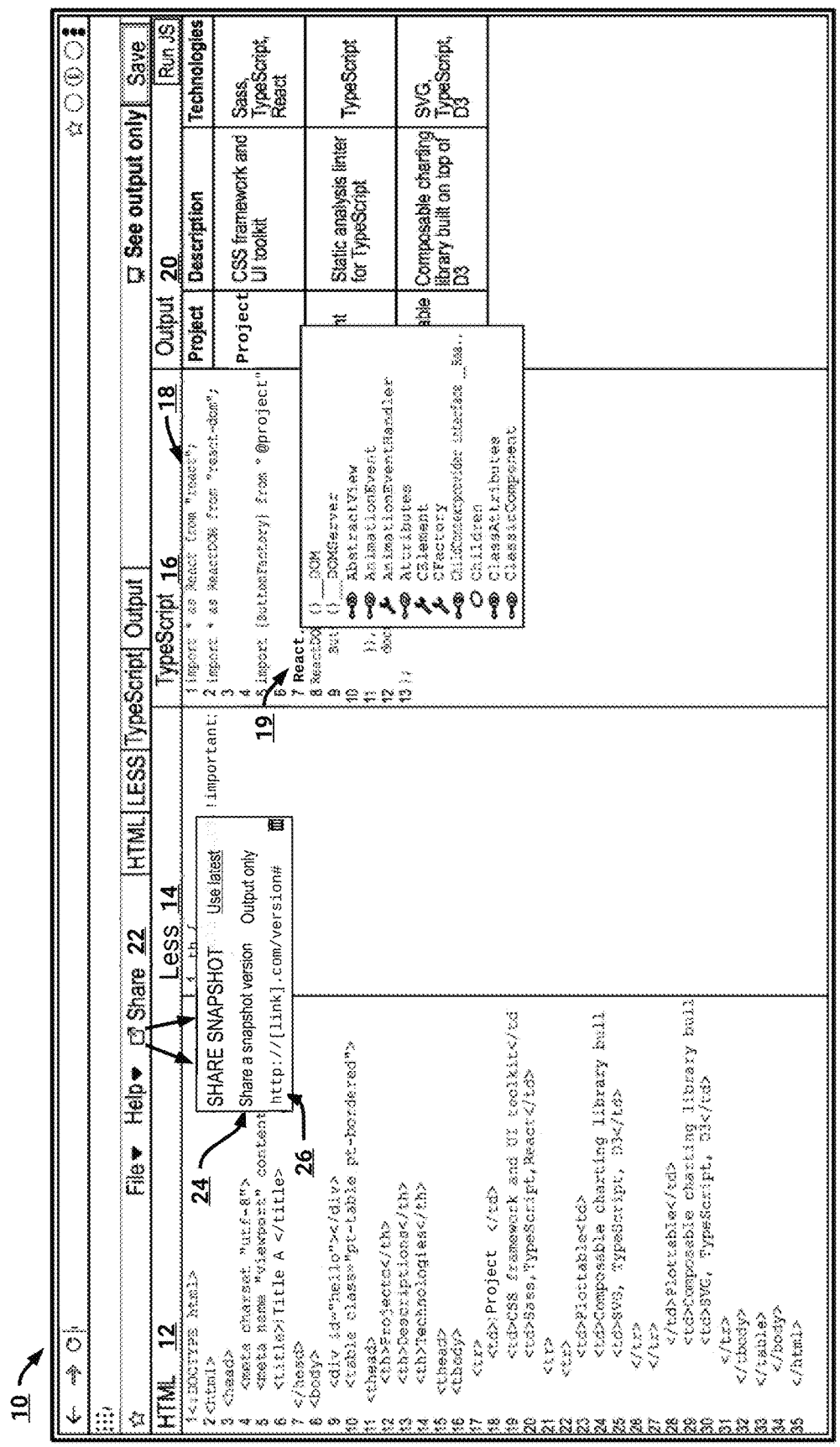
FIG. 1B illustrates an example user interface for sharing content.

FIG. 1B illustrates an example user interface 10 for sharing content. The user interface 10 of FIG. 1B can represent the user interface 10 of FIG. 1A subsequent to an interaction with selectable option 22 to share content. As illustrated, upon interaction with option 22 the user interface 10 can update to present a visual element 24 associated with sharing content. A user of the user interface 10 can specify whether he/she is to share an output (e.g., the output included in visual portion 20) or share a snapshot of the user interface 10 (e.g., the input code, output, and so on).

The visual element 24 includes a reference 26, which in the example of FIG. 1B represents a hyperlink associated with a web address at which the user interface 10 is accessible. A user can share the reference 26 to other users, and the other users can access the user interface 10 based on the reference 26. For example, web browsers executing on user devices of the other users can access the hyperlink, and view the user interface 10. Optionally, user access rights can be specified for the reference 26 such that only specifically indicated users can access the user interface 10. Optionally, the user access rights can indicate privileges associated with user interface 10. For example, the privileges can indicate that users who follow the reference 26 can view the input code, but not edit the input code, or view and edit the input code, and so on.

Figure 2:
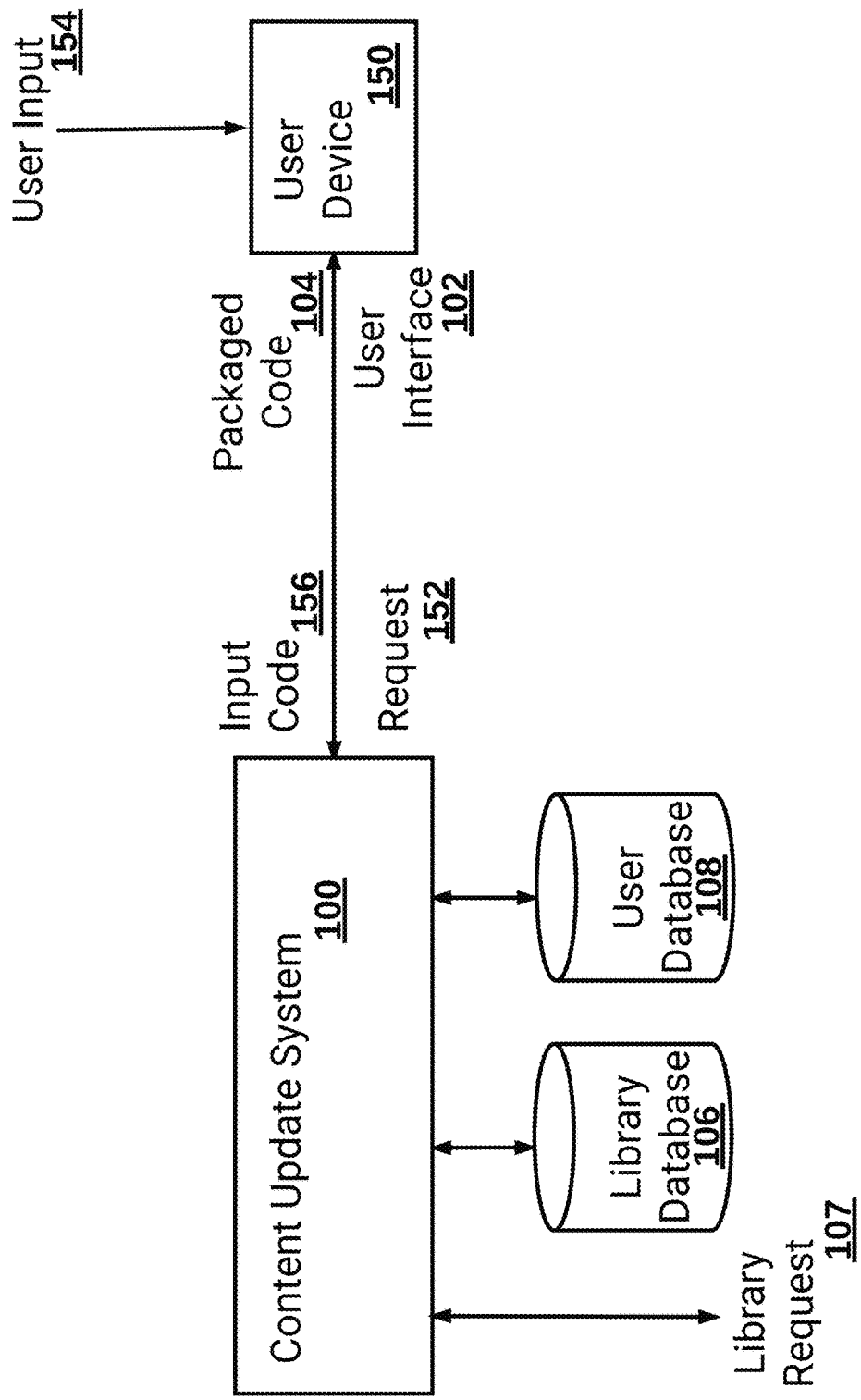
FIG. 2 illustrates an example content update system.

FIG. 2 illustrates an example content update system 100. The content update system 100 can be a system of one or more computers, one or more virtual machines executing on a system of one or more computers, and so on. The content update system 100 can be in communication with a user device 150, such as a mobile device, tablet, laptop, computer, and so on. As described above, the content update system 100 can generate user interfaces 102 for presentation on the user device that are associated with real-time editing of content. While the example of FIG. 2 illustrates the content update system 100 generating user interfaces, receiving input code, packing code to be provided to the user device, and so on, as will be described one or more of these features can be performed by the user device 150.

As illustrated, the user device 150 can provide a request 152 to the content update system 100 for a user interface 102 to edit content. For example, a user of the user device 150 can utilize a web browser to request that the content update system 100 provide an interactive document (e.g., a web page) to the user device for presentation. The request 152 can be received by the content update system 100 over a network such as a local or wide area network, the internet, and so on. The user device can present (e.g., render) the received user interface 102, for example in a web browser, and can receive user input 154 associated with the user interface 102. For example, the user interface 102 can be the user interface 10 illustrated in FIG. 1A, and the user input 154 can represent input code included in visual portions of the user interface 10. As described above, the input code can comprise markup code, style sheet code, and/or dynamic code. The user device 150 can present an output associated with the input code. Optionally, the user device 150 can present an output associated with markup code and/or style sheet code as the user input 154 is received.

With respect to dynamic code (e.g., JavaScript, TypeScript) being input, the user device 150 can provide the input code 156 to the content update system 100 for processing. As described above, for dynamic code that is required to be compiled (e.g., converted) into JavaScript, such that the user device 150 can interpret it, the content update system 100 can perform the transcompilation process. Once converted into JavaScript, the content update system 100 can generate a package 104, for example via Webpack or other packaging software, that includes imported code libraries, modules, dependencies, and so on. Similarly, for input code 156 that is JavaScript, the content update system 100 can generate a package 104 to be provided to the user device 150.

As described above, with respect to FIG. 1A, a user can specify that code libraries and/or modules are to be imported. The content update system 100 can maintain, or access, a library database 106 that stores code libraries. For example, the library database 106 can store code libraries commonly requested for importation by users, such that the content update system 100 has fast local access to the code libraries. Additionally, the library database 106 can store multiple versions of each of the code libraries, such as a threshold number of most recent versions or all versions. Advantageously, the content update system 100 can obtain arbitrary code libraries, for example code libraries not stored in the library database 106. To obtain an arbitrary code library, the content update system 100 can utilize a package manager, and obtain the arbitrary code library (e.g., via npm). Similarly, if the user requests a particular version of a code library not stored in the library database 106, the content update system 100 can obtain the particular version.

The content update system 100, once imported code libraries and/or modules are obtained, can generate packaged code 104 to be provided to the user device 150. The packaged code 104 can include the imported code libraries and/or modules, any dependencies that are required, and the dynamic code input by the user. In this way, the user device 150 can receive the packaged code 104, and present an output associated with any input markup code, style sheet code, and the packaged code 104.

The content update system 100 further includes a user database 108 that can store states associated with user interfaces presented on user devices. For example, a state associated with user interface 102 presented on user device 150 can be stored by the content update system 100. The state can include input code, user access rights information (e.g., indications of users who can view and/or edit the input code), output information, and so on. The user database 108 can maintain the state information, and optionally the state information can be accessible to user devices. For example, and as further described in FIG. 1B, a user of user device 150 can make the user interface 102 accessible to one or more other users. For example, the user can share a reference (e.g., network address, hyperlink, and so on) associated with the user interface 102 to the one or more other users. The reference can be associated with the content update system 100, and can optionally include information indicative of the user interface 102. If a particular user follows (e.g., causes his/her user device to access the reference), the content update system 100 can access the user database 108 and obtain state information associated with the user interface 102. The content update system 100 can then provide user interface 102 for presentation on the particular user's user device.

Additionally, references to input code input in the user interface 102, such as hyperlinks, can be utilized in web pages to present an output associated with the input code. For example, a user (e.g., a designer, developer) can create particular content using the user interface 102. Instead of copying/pasting the input code into one or more source code files associated with a web page, a reference to the input code stored on the content update system 100 can be utilized. For example, the web page can be served live to end users. Optionally, the system 100 can render the input code, and the reference can link to the rendering. In this way, the web page can present the rendering created by the system 100. Optionally, the reference can link to the input code, and the web page can include a frame (e.g., an iframe) that includes the input code based on the reference.

Furthermore, the user database 108 can store version information associated with user interface 102, and forks of user interface 102. For example, as user input 154 is received at user device 150, for example user input 154 associated with input of code in the user interface 102, the content update system 100 can generate different versions of the user interface 102. In this way, users can monitor a progression associated with the user interface 102, and view the particular input code included in the user interface 102 at different points in time. Additionally, forks of user interface 102 can be created, such that different input code can be included and different features tested.

The user database 108 can enable a user of the user device 150 to cause importation of previously written input code.

For example, the user can save input code, for example save the input code as being associated with a label (e.g., a file name). The user can then reference the label when writing input code, and the content update system 100 can obtain the associated input code. In this way, the user can write complex dynamic code functionality, for example atomic functionality, and easily import his/her previously written dynamic code. The user can further import dynamic code that was created by one or more other users using the user interface 102. For example, the content update system 100 can determine access rights associated with the user, and if the user inputs a label associated with shared input code, the content update system 100 can import the input code. As will be described below, the obtained input code can be included in the user interface 102, or optionally just the import statement can be included in the user interface 102.

Figure 3:
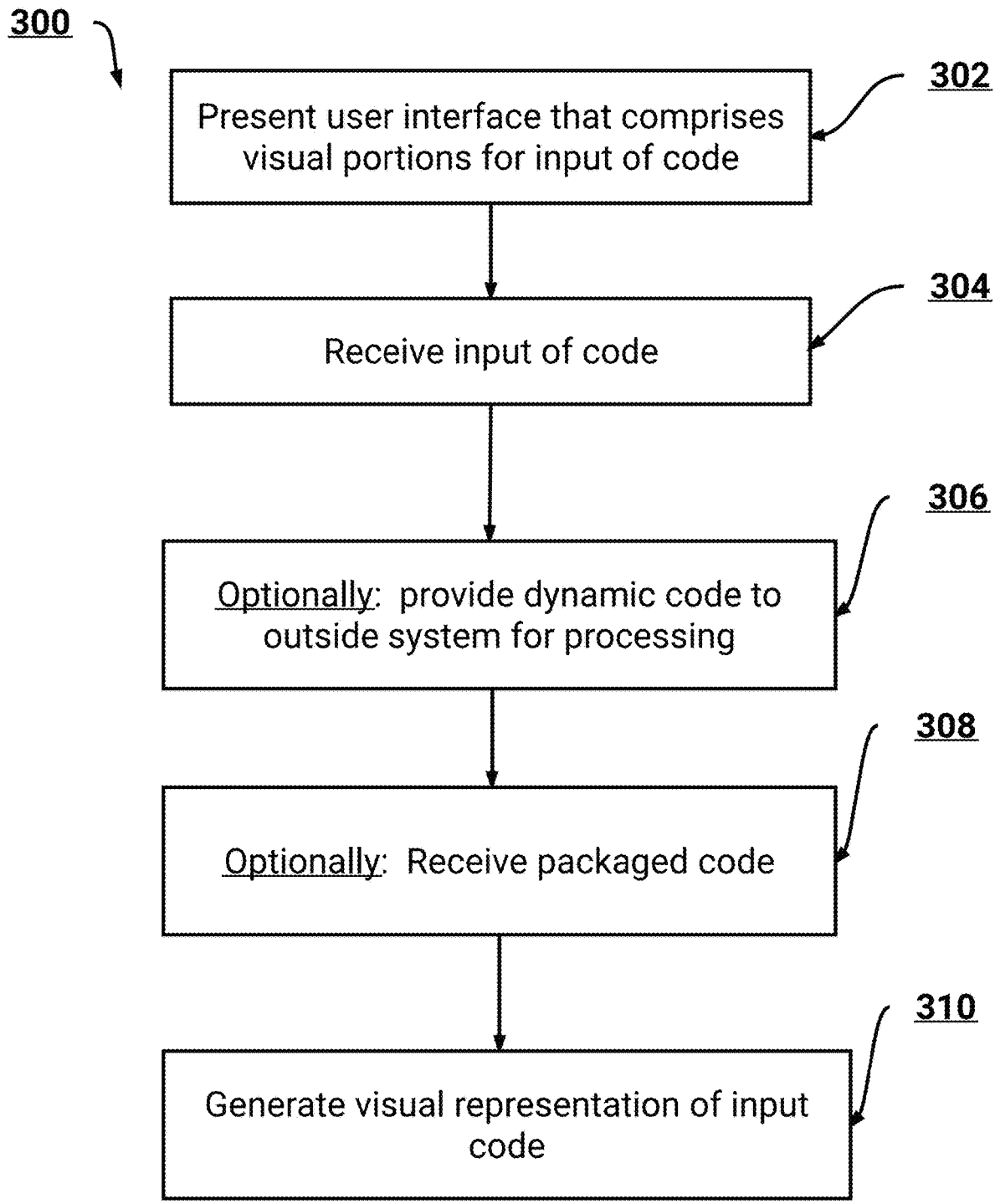
FIG. 3 illustrates an example process for designing content on a user device.

FIG. 3 illustrates an example process 300 for designing content on a user device. For convenience, the process 300 will be described as being performed by a user device of one or more processors (e.g., the user device 150).

The user device presents a user interface (block 302). As described above, the user device can provide a request for a document, such as a web page, to a system (e.g., the content update system 100). Upon receipt of the document, the user device can present (e.g., render) the document for user interaction. For example, a web browser executing on the user device can render the document. Optionally, the user interface may be generated, at least in part, via an application executing on the user device. For example, the user device may obtain an application (e.g., an "app" obtained from an electronic application store), and the application may generate the user interface for presentation on the user device.

The user device receives input of code (block 304). As illustrated in FIGS. 1A-1B, the user interface can include visual portions each associated with input of code. For example, each visual portion can be associated with a particular type of code. An example visual portion can be associated with input of markup code, while another example visual portion can be associated with input of style sheet code, dynamic code, and so on. A user of the user device can specify visual portions to be included, for example the user can specify that only markup code and stylesheet code is to be input. For example, the user can interact with a selectable object of the user interface, and indicate his/her selection of types of code to be input.

The user can enter code, for example on a keyboard, or verbally speak code (e.g., the user device can process received audio to determine words being spoken, or can provide the received audio to an outside system for processing). Optionally, as described above, the user can cause importation of previously written code. For example, the user can interact with a selectable object to open a previously saved version of input code. As another example, the user can input a statement associated with importing code, and the user device can present identifiers associated with previously written input code. For instance, the user can enter a particular label (e.g., the user can enter the "@" symbol), and the user interface can present labels associated with previously saved versions of input code. Upon selection of a label, the user interface can cause the associated saved input code to be automatically included in the user interface. Optionally, the selected label can be interactive, such that if the user interacts with (e.g., clicks on, presses on, and so on) the selected label, the user interface can present the associated saved input code. Furthermore, if the user utilizes greater than a threshold pressure on a display of the user device when interacting with the selected label, the user interface can update to present a view of the associated saved input code while greater than the threshold pressure is maintained.

As the user device receives input of code, the user device can present an output associated with the input. For example, a particular visual portion of the user interface can present an output associated with the input of code, and the output can be generated based on the received input. Optionally, and as described above, the particular visual portion can be a frame, such as an iframe, that causes the particular types of input code to be embedded in the particular visual portion. Example types of embedded code can include markup and/or style sheet code. The user device can then cause the rendering of the embedded input code such that the output can be presented to the user. For example, a web browser presenting the user interface can render the input code. In this way, as code is input into the user interface, the user device can present an output.

The user device optionally provides dynamic code to an outside system for processing (block 306). As described above, dynamic code can be provided to a system for processing, such as the content update system 100. The user device can provide the dynamic code to the system as the user inputs it, or after a particular criterion is reached. For example, an example criterion can include the user device detecting a new line being entered, a closing brace being entered, a white space being entered, and so on. Optionally, the user device can process the input code to determine when a minimum viable amount of code is input. That is, the user device can provide the input dynamic code based on an initial indication that sufficient dynamic code has been provided to perform a modicum of functionality.

The dynamic code can include reference to one or more code libraries or specific modules that are to be imported. As illustrated in FIG. 1A, the user can enter import statements utilized with a particular programming language associated with the dynamic code, and the system can obtain the imported code libraries or modules. Furthermore, the user can specify a particular version of an imported code library, or optionally multiple versions of the code library. As described above, in the case of the user specifying multiple versions, the user interface can present multiple outputs each associated with a version. As described above, the system can have particular code libraries stored for ease and efficiency of access. Additionally, the system can utilize a package manager to obtain any accessible code library specified by the user. As described above, the user can include a reference to dynamic code previously written by the user, or shared with the user. That is, the user, or a different user, can input code utilizing the user interface, and the system can store the dynamic code. For example, the dynamic code can be associated with a label, such that the user can subsequently reference the previously input dynamic code.

The user device receives packaged code (block 308). Subsequent to providing dynamic code to the outside system for processing, the user device receives packaged code. The system can obtain the code libraries and or modules requested for importation by the user, and can package the code libraries and/or modules along with any dependencies and the dynamic code input by the user.

Optionally, the user device can optionally determine not to provide dynamic code to the system for processing. For example, if the dynamic code is of a particular programming language that the user device can interpret (e.g., JavaScript), and the dynamic code does not import new code libraries, the user device can interpret the dynamic code in lieu of providing it to the system. For example, as the user device receives packaged code, it can cache received code libraries. Additionally, if the dynamic code is of a programming language that needs to be compiled, the user device can provide the dynamic code to the system for processing. Optionally, the user device can perform the compilation.

The user device generates a visual representation of the input code (block 310). The user device renders the input code, for example utilizing a web browser to interpret the received dynamic code, markup code, and input code.

Figure 4:
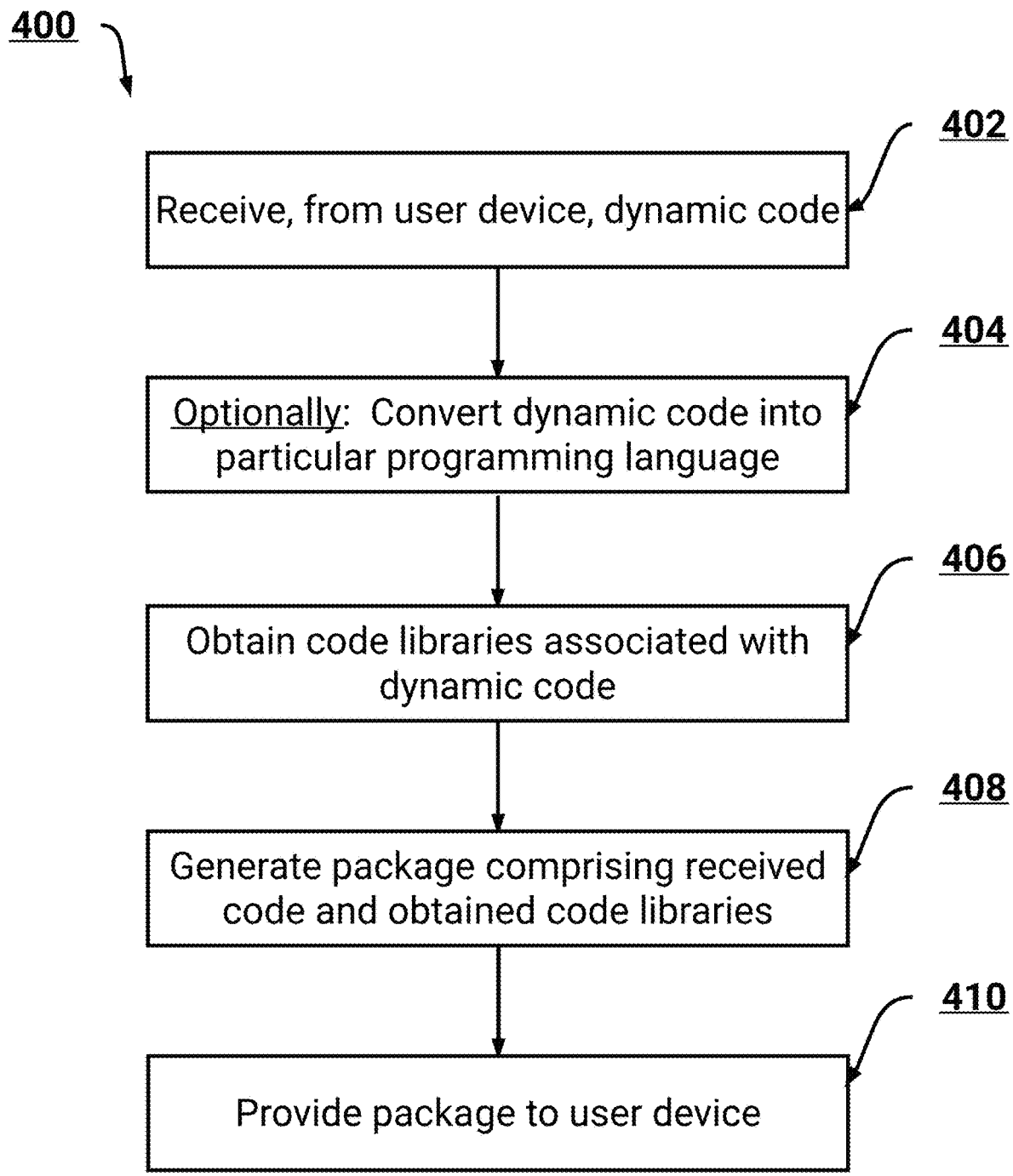
FIG. 4 illustrates an example process for providing packaged code to a user device.

FIG. 4 illustrates an example process 400 for providing packaged code to a user device. For convenience, the process 400 will be described as being performed by a system of one or more computers (e.g., the content update system 100).

The system receives dynamic code from a user device (block 402). As described above, the system can generate user interface information for presentation on a user device, such as a web page presented on the user device. The system can receive dynamic code input into the user interface by the user, for example JavaScript, TypeScript, and so on. Optionally, the system can execute a web application back-end, such that the system can receive user interactions from the user via the user interface, cause updates to the user interface (e.g., asynchronous updates), generate the user interface in response to user requests, and so on.

The system optionally converts the dynamic code into a particular programming language (block 404). The dynamic code received by the system can be dynamic code that is to be compiled into JavaScript. For example, if the dynamic code is TypeScript, the system can compile (e.g., transcompile) the dynamic code into JavaScript for interpretation by the user device (e.g., a browser on the user device).

The system obtains code libraries associated with the received dynamic code (block 406). As described above, the system can obtain code libraries and/or particular modules indicated in the received dynamic code as being imported. The system can further access user information associated with a user inputting the dynamic code, and determine whether the dynamic code references previously user created dynamic code. Similarly, the system can determine whether the dynamic code references previously user created dynamic code that has been shared with the user, for example according to access restrictions associated with the user.

The system generates a package comprising the received dynamic code and obtained code libraries (block 408). The system generates the package, along with any dependencies associated with the code libraries, such that the user device can interpret the included dynamic code.

The system provides the package to the user device (block 410). The system provides the package over a network, such as the internet. Optionally, to increase efficiency and reduce bandwidth requirements, the system can provide the obtained code libraries once to the user device optionally along with information indicating the user device is to cache the code libraries. For example, as the system receives additional dynamic code, the system can determine whether the dynamic code imports the same code libraries. Upon a positive determination, the system can optionally convert the dynamic code into the articular programming language (e.g., JavaScript), and provide the converted dynamic code to the user device.

Optionally, alerts and/or notifications can be transmitted to user devices of users associated with input code. For example, if a user shares input code with a different user, and the different user makes modifications and/or causes an output to be provided on a particular web page (e.g., a live web page), an alert can be generated to the user. In some embodiments, the alert and/or notification is automatically transmitted to the device operated by an entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a health data monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the integrated health interface system so that the entity can log in to the integrated health interface system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
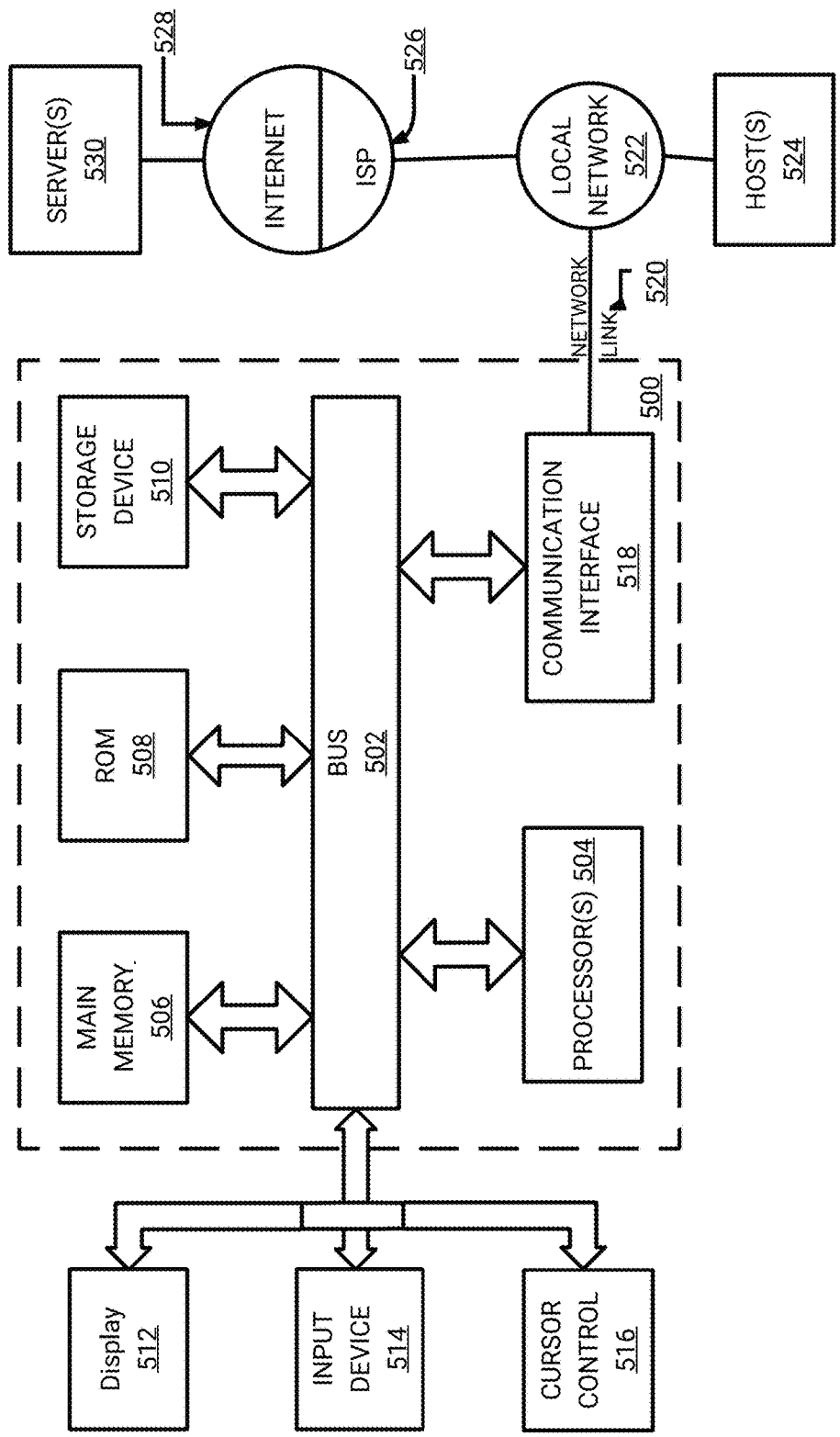
FIG. 5 illustrates a computer system with which certain methods discussed herein may be implemented.

For example, FIG. 5 is a block diagram that illustrates a computer system 500 upon which various embodiments may be implemented. The example computer system 500 can optionally represent the content update system 100 described above, and/or the user device 150. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
one or more computer processors configured to execute software code to perform operations comprising:
presenting, via a user device, an interactive user interface comprising a plurality of visual portions, the interactive user interface being generated via a server system and usable, by the server system, to render a content page, wherein the interactive user interface is configured to receive user input of code in a first visual portion of the plurality of visual portions, the code comprising code to be executed and an identification of, at least, a portion of a particular library which is usable to interpret or compile the code, wherein the first visual portion is segmented and configured to receive input of different types of code in individual segments, wherein the types of code are usable to define different aspects associated with the content page, and wherein the input code is configured to form a rendering associated with the content page;

causing, via the server system, a package manager to import the portion of the particular library based on the identification, such that the portion is local in scope; and causing, in response to receiving the user input, rendering of the input code via the server system, wherein the interactive user interface is configured to update to present the rendering in a second visual portion of the plurality of visual portions, wherein the server system is configured to present the rendering in one or more other content pages accessible to end-users of different user devices, and wherein updates to the rendering caused by user input to the user device are updated in the one or more other content pages presented on the different user devices.

2. The computer system of claim 1, wherein the interactive user interface is configured to receive user input indicating the different types of code of a plurality of types of code associated with the user input of code in the first visual portion.

3. The computer system of claim 1, wherein the interactive user interface is configured to:
present a plurality of versions associated with the particular library; and
receive selection of a particular version for importation via the package manager.

4. The computer system of claim 3, wherein the second visual portion includes a plurality of renderings of the input code, and wherein each of the plurality of renderings is based on a respective version of the plurality of versions associated with the particular library.

5. The computer system of claim 1, wherein the operations further comprise:
providing user input of code to the server system; and
as additional code is received, presenting selectable options associated with auto-completion of the additional code, the selectable options being based on the particular library.

6. The computer system of claim 1, wherein the portion of the particular library represents one or more modules associated with the particular library, the modules being indicated in the user input.

7. The computer system of claim 1, wherein the operations further comprise:
providing user input of code to the server system; and
as additional code is received, updating the rendering in the second visual portion.

8. A method comprising:
by a system of one or more processors,
presenting, via a user device, an interactive user interface comprising a plurality of visual portions, the interactive user interface being generated via a server system and usable, by the server system, to render a content page, wherein the interactive user interface is configured to receive user input of code in a first visual portion of the plurality of visual portions, the code comprising code to be executed and an identification of, at least, a portion of a particular library which is usable to interpret or compile the code, wherein the first visual portion is segmented and configured to receive input of different types of code in individual segments, wherein the types of code are usable to define different aspects associated with the content page, and wherein the input code is configured to form a rendering associated with the content page;

causing, via the server system, a package manager to import the portion of the particular library based on the identification, such that the portion is local in scope; and causing, in response to receiving the user input, rendering of the input code via the server system, wherein the interactive user interface is configured to update to present the rendering in a second visual portion of the plurality of visual portions, wherein the server system is configured to present the rendering in one or more other content pages accessible to end-users of different user devices, and wherein updates to the rendering caused by user input to the user device are updated in the one or more other content pages presented on the different user devices.

9. The method of claim 8, wherein the interactive user interface is configured to receive user input indicating the different types of code of a plurality of types of code associated with the user input of code in the first visual portion.

10. The method of claim 8, wherein the interactive user interface is configured to:
present a plurality of versions associated with the particular library; and
receive selection of a particular version for importation via the package manager.

11. The method of claim 10, wherein the second visual portion includes a plurality of renderings of the input code, and wherein each of the plurality of renderings is based on a respective version of the plurality of versions associated with the particular library.

12. The method of claim 8, further comprising:
providing user input of code to the server system; and
as additional code is received, presenting selectable options associated with auto-completion of the additional code, the selectable options being based on the particular library.

13. The method of claim 8, wherein the portion of the particular library represents one or more modules associated with the particular library, the modules being indicated in the user input.

14. The method of claim 8, further comprising:
providing user input of code to the server system; and
as additional code is received, updating the rendering in the second visual portion.

15. Computer program product storing instructions that when executed by a system of one or more processors, cause the one or more processors to perform operations comprising:
presenting, via a user device, an interactive user interface comprising a plurality of visual portions, the interactive user interface being generated via a server system and usable, by the server system, to render a content page, wherein the interactive user interface is configured to receive user input of code in a first visual portion of the plurality of visual portions, the code comprising code to be executed and an identification of, at least, a portion of a particular library which is usable to interpret or compile the code, wherein the first visual portion is segmented and configured to receive input of different types of code in individual segments, wherein the types of code are usable to define different aspects associated with the content page, and wherein the input code is configured to form a rendering associated with the content page;

causing, via the server system, a package manager to import the portion of the particular library based on the identification, such that the portion is local in scope; and causing, in response to receiving the user input, rendering of the input code via the server system, wherein the interactive user interface is configured to update to present the rendering in a second visual portion of the plurality of visual portions, wherein the server system is configured to present the rendering in one or more other content pages accessible to end-users of different user devices, and wherein updates to the rendering caused by user input to the user device are updated in the one or more other content pages presented on the different user devices.

16. The computer program product of claim 15, wherein the interactive user interface is configured to receive user input indicating the different types a type of code of a plurality of types of code associated with the user input of code in the first visual portion.

17. The computer program product of claim 15, wherein the interactive user interface is configured to:
present a plurality of versions associated with the particular library; and
receive selection of a particular version for importation via the package manager.

18. The computer program product of claim 15, wherein the second visual portion includes a plurality of renderings of the input code, and wherein each of the plurality of renderings is based on a respective version of the plurality of versions associated with the particular library.

19. The computer program product of claim 15, wherein the portion of the particular library represents one or more modules associated with the particular library, the modules being indicated in the user input.

20. The computer program product of claim 15, wherein the operations further comprise:
providing user input of code to the server system; and
as additional code is received, updating the rendering in the second visual portion.

\* \* \* \* \*